United States Patent [19]
Jang et al.

[11] Patent Number: 6,125,046
[45] Date of Patent: Sep. 26, 2000

[54] SWITCHING POWER SUPPLY HAVING A HIGH EFFICIENCY STARTING CIRCUIT

[75] Inventors: Kyung-Oun Jang, Incheon; Dong-Myeong Shin, Bucheon; Dae-Bong Kim; Chang-Ho Kim, both of Incheon, all of Rep. of Korea

[73] Assignee: Fairfield Korea Semiconductor Ltd., Kyungki-do, Rep. of Korea

[21] Appl. No.: 09/435,290

[22] Filed: Nov. 5, 1999

[30] Foreign Application Priority Data

Nov. 10, 1998 [KR] Rep. of Korea ............. 98-47940

[51] Int. Cl.[7] ................................ H02M 3/335
[52] U.S. Cl. .................... 363/49; 363/21; 363/97
[58] Field of Search ................ 363/20, 21, 49, 363/41, 95, 97, 131

[56] References Cited

U.S. PATENT DOCUMENTS

| | | | |
|---|---|---|---|
| 4,236,198 | 11/1980 | Ohsawa et al. | 363/49 |
| 4,263,645 | 4/1981 | Zellmer | 363/49 |
| 5,014,178 | 5/1991 | Balakrishnan | 363/49 |
| 5,285,369 | 2/1994 | Balakrishnan | 363/49 |
| 5,436,820 | 7/1995 | Furmanczyk | 363/49 |
| 5,459,652 | 10/1995 | Faulk | 363/49 |
| 6,002,598 | 12/1999 | Seinen et al. | 363/49 |

*Primary Examiner*—Adolf Deneke Berhane
*Attorney, Agent, or Firm*—Marshall, O'Toole, Gerstein, Murray & Borun

[57] ABSTRACT

A switching power supply having a high efficiency starting circuit uses a field effect transistor to provide initial starting current to a pulse width modulated signal generator within a switching control circuit. The field effect transistor (FET) has a drain connected to a source of supply voltage, a source connected to the PWM signal generator, and a gate connected to a feedback voltage that is derived from an output voltage of the switching power supply. During start up of the switching power supply, the FET provides current to the PWM signal generator. When the feedback voltage reaches a predetermined level, the FET supplies substantially near zero current to the PWM signal generator, thereby eliminating the electrical inefficiencies typically associated with a conventional switching power supply starting circuit.

16 Claims, 3 Drawing Sheets

6,125,046

SWITCHING POWER SUPPLY HAVING A HIGH EFFICIENCY STARTING CIRCUIT

BACKGROUND OF THE INVENTION

1. Field of the Invention

The invention relates generally to switching power supplies. More particularly, the invention relates to a switching power supply having a high efficiency starting circuit.

2. Description of Related Technology

Generally speaking, a switching power supply (SPS) provides a cost effective and energy efficient device for converting energy from a single direct current (DC) supply voltage into one or more DC output voltages that have a greater or lesser magnitude than the supply voltage. Traditionally, a SPS has an integrated control circuit that modulates the duty cycle of a transistor switch, which controls the flow of energy into the primary of a transformer to produce one or more desired output voltages that are derived from the secondary of the transformer. As is well known, the energy (i.e., the time integral of power) supplied to the primary of the transformer minus efficiency losses equals the energy transferred to the secondary of the transformer. Thus, if more energy (i.e., voltage and/or current) is needed by the secondary, then the control circuit increases the duty cycle of the transistor switch to provide more energy to the primary. Conversely, if less energy is needed by the secondary, then the control circuit decreases the duty cycle of the transistor switch.

FIG. 1 is an exemplary schematic diagram of a conventional SPS, which includes a direct current (DC) voltage supply block 10, a voltage output block 20, a feedback block 30, and a switching control circuit 40. The DC voltage supply block 10 includes a bridge rectifier 1 and a filter capacitor C1. The bridge rectifier 1 rectifies alternating current (AC) line voltage to produce current pulses which are substantially smoothed to a DC supply voltage Vcc by the filter capacitor C1. For example, if the AC line voltage is 110 volts AC, then the smoothed DC supply voltage across capacitor C1 may be approximately 155 volts DC.

The output voltage block 20 includes a switching transformer 22 having a primary winding L1 and secondary windings L2 and L3 and switching rectifier diodes D5 and D6 that receive current pulses from the respective secondary windings L2 and L2 to provide rectified current pulses to respective filter capacitors C2 and C3. The filter capacitors C2 and C3 smooth the rectified current pulses to substantially DC voltages.

The feedback block 30 includes a voltage feedback amplifier 3 and a photo-coupler 4. The feedback amplifier 3 detects the DC voltage across the filter capacitor C2 and provides a proportional current to the photo-coupler 4.

The switching control circuit 40 includes a pulse width modulated (PWM) signal generator 5, a switching transistor M1, and a feedback capacitor C4. The switching transistor M1 is connected to the primary L1 of the transformer 22 and is switched on and off by the PWM signal generator 5 at a duty cycle that is based on the magnitude of a feedback voltage VFB on the feedback capacitor C4.

Initially, when AC line voltage is first provided to the bridge rectifier 1, the supply voltage Vcc applied to the PWM signal generator 5 is substantially near zero volts DC and the PWM signal generator 5 is off. Additionally, because the PWM signal generator 5 is off, the switching transistor M1 is off, energy is not being provided to the primary winding L1, and the output voltages across capacitors C2 and C3 are substantially near zero volts DC.

As is generally known, the PWM signal generator 5 is typically fabricated using conventional integrated circuit technologies and requires a relatively low DC supply voltage, which may be, for example, between 4 volts DC and 12 volts DC. Typically, the low supply voltage required by the PWM signal generator 5 is derived from the output voltage block 20. Thus, as shown in FIG. 1, the supply voltage Vcc for the PWM signal generator 5 is connected to the voltage across capacitor C3. Additionally, because the voltage across capacitor C3 is initially substantially near zero volts DC, a start up resistor R is connected between capacitors C1 and C3. The start up resistor R provides an initial charging current to capacitor C3 that causes the voltage across C3 to increase. Once the voltage on C3 reaches a level sufficient to cause the PWM signal generator 5 to begin functioning, the voltage across C3 is regulated by the operation of the PWM signal generator 5 and the current flowing through the start up resistor R no longer increases the voltage on C3.

Although the start up resistor R is needed to the start the operation of the PWM signal generator 5, the start up resistor R becomes a significant source of energy inefficiency once the PWM signal generator 5 is operational. More specifically, a large voltage differential exists across the start up resistor R because the difference between the output voltage of the supply block 10 is substantially greater than the low voltage supply Vcc for the PWM signal generator 5. For example, the output voltage of the supply block 10 may be 155 volts DC while the low voltage supply Vcc is 5 volts DC. This large voltage drop during continuous operation of the SPS results in a significant source of energy inefficiency.

SUMMARY OF THE INVENTION

In accordance with one aspect of the invention, a high efficiency starting circuit for use in a switching power supply having a voltage source, a transformer, an output voltage circuit coupled to the transformer, a feedback circuit coupled to the output voltage circuit, and a pulse width modulated (PWM) signal generator coupled to the feedback circuit and the transformer, includes a transistor coupled to the voltage source, the feedback circuit, and the PWM signal generator. The transistor may be adapted to provide a source of current to the PWM signal generator during start up of the switching power supply and to conduct substantially near zero current once a feedback voltage from the feedback circuit reaches a predetermined voltage.

In accordance with another aspect of the invention, a switching power supply includes a transformer and a power supply circuit that provides a supply voltage. The switching power supply may further include output voltage circuits coupled to the transformer, a voltage feedback circuit coupled to the output voltage circuits, a feedback capacitor coupled to the feedback circuit, and a switching control circuit. The switching control circuit may include a PWM signal generator having a feedback/supply input and a switching output signal, a first transistor coupled to the switching output signal and the primary winding, and a second transistor coupled to the supply voltage and the feedback capacitor. The second transistor may be adapted to supply current to the PWM signal generator and the feedback capacitor during start up of the switching power supply and may be further adapted to provide substantially near zero current to the PWM signal generator when a voltage on the feedback capacitor reaches a predetermined value.

The invention itself, together with further objects and attendant advantages, will best be understood by reference

DETAILED DESCRIPTION OF THE PREFERRED EMBODIMENTS

The switching power supply (SPS) described herein uses active circuitry to provide a high efficiency starting circuit. Generally speaking, the high efficiency starting circuit includes a transistor having one end connected to a relatively high voltage DC supply derived from rectified line voltage and another end that is connected to a feedback voltage derived from an output voltage of the SPS and that is also connected to a low voltage supply terminal of a PWM signal generator. More specifically, the feedback voltage is applied to a control terminal of the transistor to control the conduction of the transistor so that the transistor conducts a supply current to the PWM signal generator during start up of the SPS (i.e., a period of time immediately following the application of AC power to the SPS) and conducts substantially near zero current when the SPS reaches a normal operating condition (i.e., the output voltages of the SPS have reached regulation levels).

Figure 2:
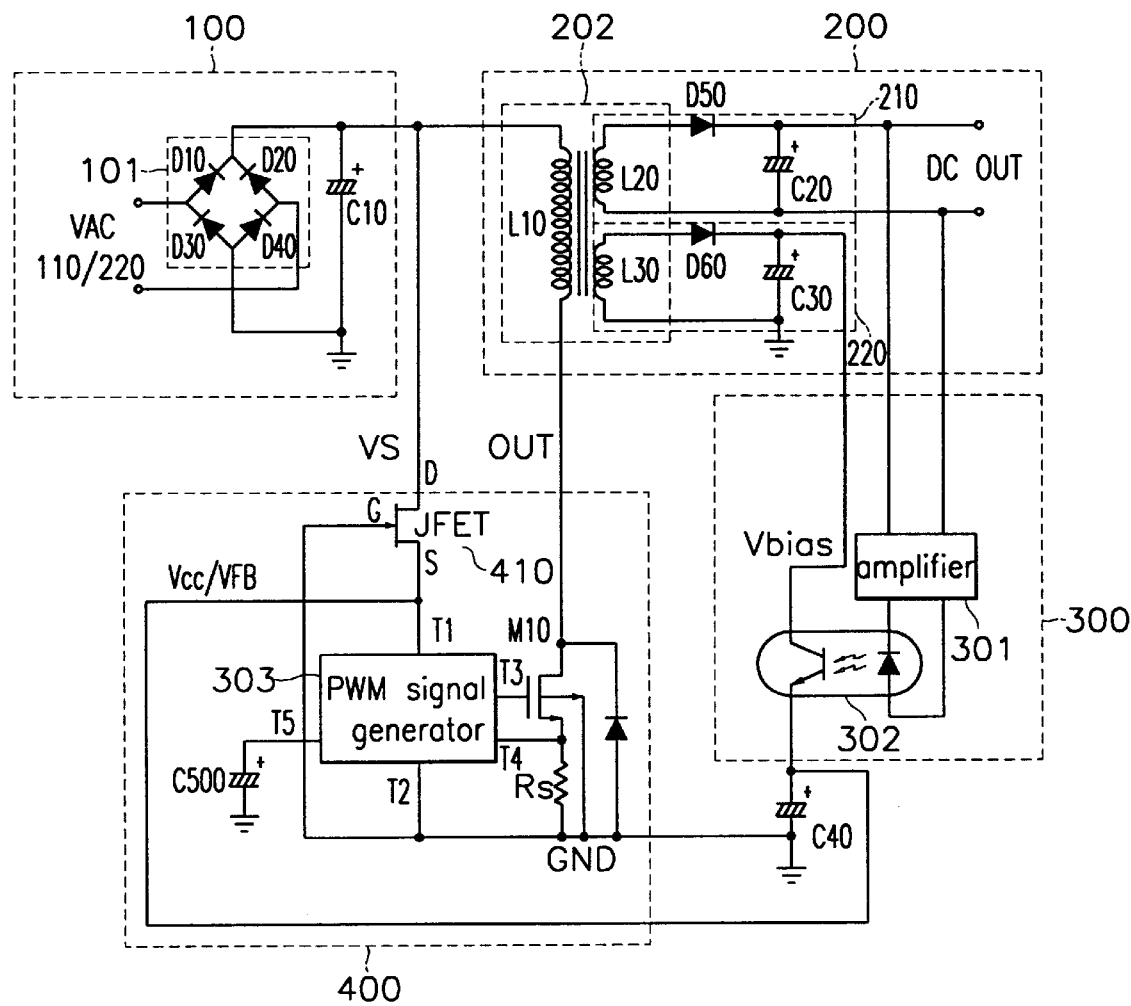
FIG. 2 is an exemplary schematic diagram of a switching power supply having a high efficiency starting circuit.

FIG. 2 is an exemplary schematic diagram of a switching power supply (SPS) having a high efficiency starting circuit. The SPS includes a DC voltage supply block 100, an output voltage block 200, a feedback block 300, and a switching control circuit block 400. The DC voltage supply block 100 includes a bridge rectifier 101 having rectifier diodes D10–D40 that provide rectified current pulses to filter capacitor C10. As is generally known, the filter capacitor C10 smooths the current pulses from the bridge rectifier 101 to provide a substantially DC voltage.

The output voltage block 200 includes a transformer 202 having a primary winging L1 and secondary windings L20 and L30, switching rectifier diodes D50 and D60, and filter capacitors C20 and C30, all connected as shown. The output voltage block 200 has a first output portion 210, which includes the secondary winding L20, the switching rectifier diode D50, and the filter capacitor C20, and a second output portion 220, which includes the secondary winding L30, the switching rectifier diode D60, and the filter capacitor C30. The first and second output portions 210 and 220 may provide electrically isolated DC voltages that may be the same or different from one another and the same or different from the DC voltage supplied by the DC voltage supply block 100. As is known, the values for the DC voltages provided by the output portions 210 and 220 are primarily determined by the relative turns ratios of the secondary windings L20 and L30 and the primary winding L10.

The feedback block 300 includes a voltage feedback amplifier 301 and a photo isolator 302. The voltage feedback amplifier 301 detects the DC voltage provided by the first output portion 210 and provides a proportional current signal that drives the photo isolator 302. The photo isolator 302 receives a bias voltage Vbias from the DC output voltage of the second output portion 220 and provides a charging current to a feedback capacitor C40.

The switching control circuit 400 includes a PWM signal generator 303, a junction field effect transistor (JFET) 410, a metal oxide semiconductor field effect transistor (MOSFET) M10, a current sense resistor Rs, which protects the MOSFET M10 from overcurrent conditions, and may optionally include a compensation capacitor C500, which allows soft switching (i.e., prevents current overshooting) during start up of the PWM signal generator 303, all connected as shown.

Figure 1:
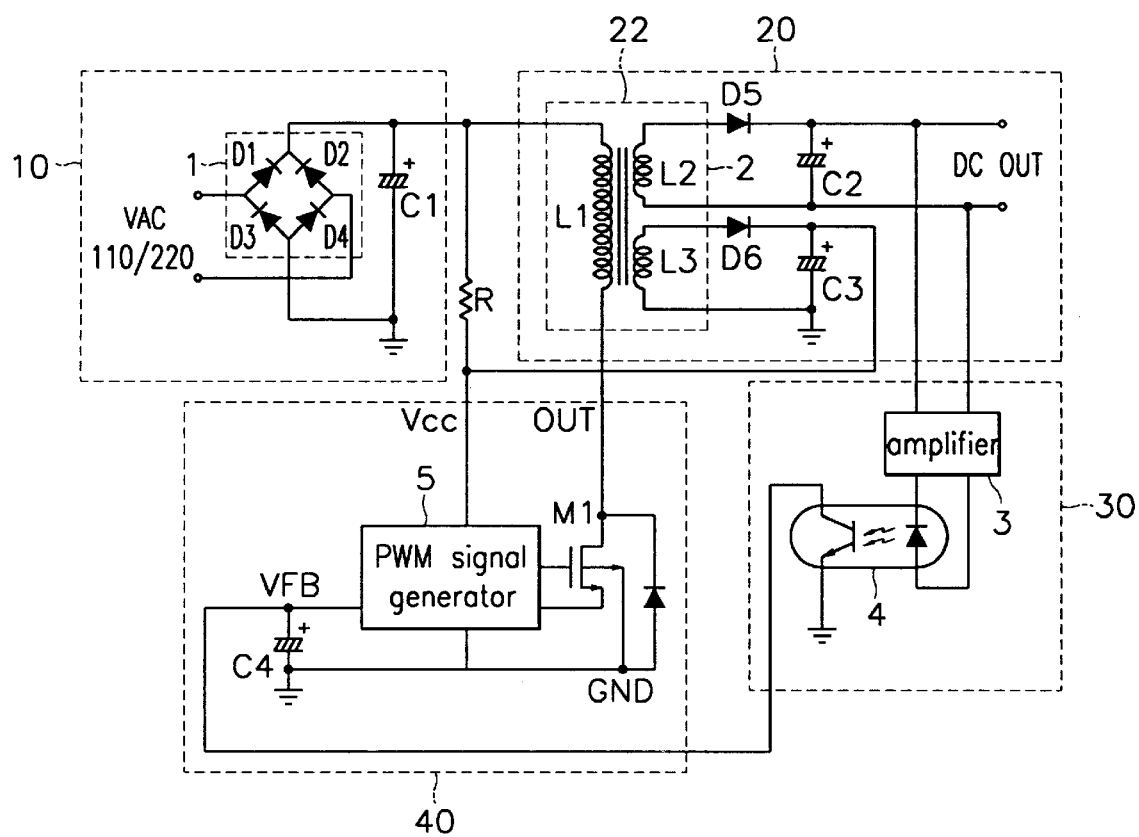
FIG. 1 is an exemplary schematic diagram of a conventional switching power supply.
Figure 3:
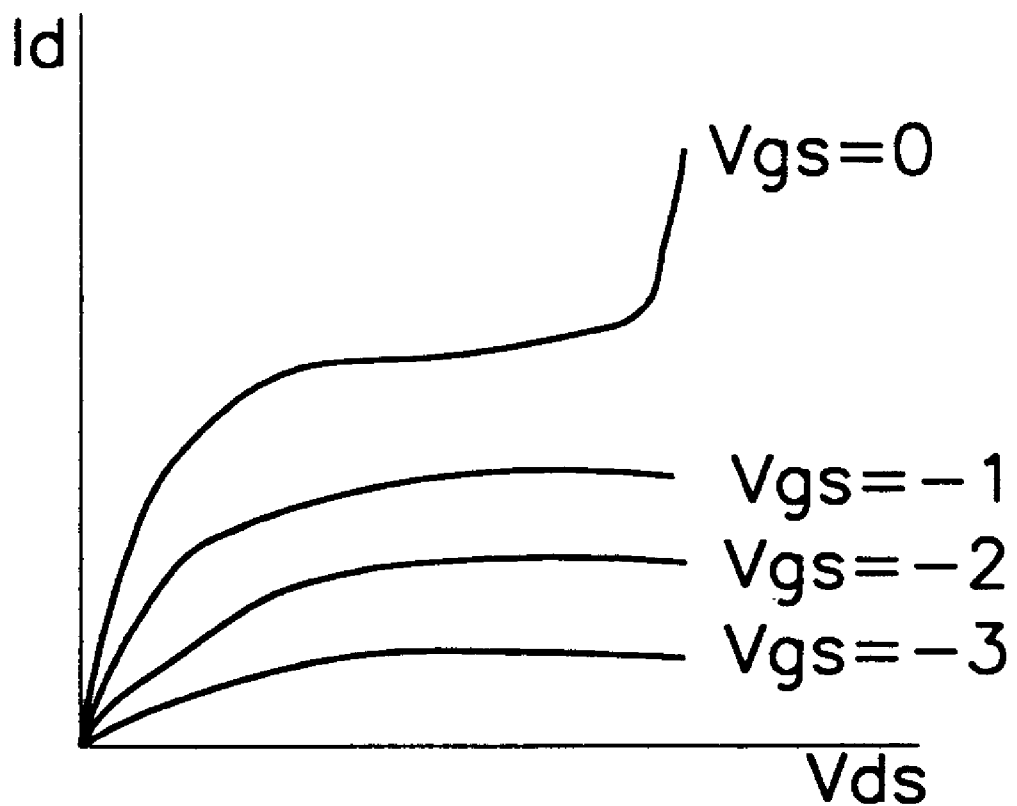
FIG. 3 is a graphical representation illustrating the drain-source characteristics of a conventional junction field effect transistor.

The start up characteristics of the SPS shown in FIG. 2 are explained in detail below and may be understood with reference to FIG. 3, which is a graphical representation illustrating the drain-source characteristics of the JFET 410. Prior to the application of AC line voltage to the bridge rectifier 101, the gate, drain, and source terminals of the JFET 410 are all at substantially near zero volts DC and no current is flowing through the JFET 410. Upon application of AC line voltage to the full wave bridge rectifier 101, the DC voltage across C1 0 and the drain terminal of the JFET 410 build rapidly to the full value of the rectified AC line voltage (e.g., 155 VDC). Because the feedback capacitor C40 introduces a time constant, the gate-source voltage (Vgs) remains near zero volts DC and, in accordance with the JFET characteristic shown in FIG. 3, begins to provide current to the PWM signal generator 303 and the feedback capacitor C40. As the voltage Vcc/VFB across the feedback capacitor C40 increases, the gate-source voltage Vgs decreases and, in accordance with the JFET characteristic shown in FIG. 3, the current provided by the JFET 410 decreases. When the voltage Vcc/VFB has reached a voltage level sufficient to operate the PWM signal generator 303, the gate-source voltage Vgs is sufficiently negative to cause the JFET 410 to conduct substantially near zero current and the PWM signal generator 303 receives supply current/voltage via the feedback block 300. Thus, the JFET 410 is turned off once the SPS shown in FIG. 2 has started up and reached a normal operation condition, thereby eliminating the inefficiency that is normally associated with a resistive start up circuit, such as that shown in connection with the SPS of FIG. 1.

A range of changes and modifications can be made to the preferred embodiment described above. The foregoing detailed description should be regarded as illustrative rather than limiting and the following claims, including all equivalents, are intended to define the scope of the invention.

What is claimed is:

1. A high efficiency starting circuit for use in a switching power supply having a voltage source, a transformer with a primary winding coupled to the voltage source and a secondary winding, an output voltage circuit coupled to the secondary winding, a feedback circuit coupled to the output voltage circuit, and a pulse width modulated (PWM) signal generator coupled to the feedback circuit and the primary winding, the high efficiency starting circuit comprising:

a field effect transistor (FET) having a drain coupled to the voltage source, a gate coupled to the feedback circuit, and a source coupled to the PWM signal generator, wherein the FET is adapted to provide a source of current to the PWM signal generator during start up of the switching power supply and to conduct substantially near zero current once a feedback voltage from the feedback circuit reaches a predetermined voltage.

2. The starting circuit of claim 1, wherein the FET is a junction field effect transistor.

3. The starting circuit of claim 1, wherein the drain receives a rectified and smoothed line voltage from the voltage source.

4. The starting circuit of claim 1, wherein the gate is connected to a ground potential.

5. The starting circuit of claim 1, wherein the source is connected to a supply input of the PWM signal generator.

6. The starting circuit of claim 5, wherein the source is connected to a feedback capacitor that receives charging currents from the feedback circuit.

7. The starting circuit of claim 5, wherein the source is connected to a feedback input of the PWM signal generator.

8. A switching power supply, comprising:
   a power supply circuit that provides a substantially direct current (DC) supply voltage;
   a transformer having a primary winding coupled to the supply voltage and first and second secondary windings;
   a first output voltage circuit coupled to the first secondary winding;
   a second output voltage circuit coupled to the second secondary winding;
   a voltage feedback circuit coupled to the first and second output voltage circuits;
   a feedback capacitor coupled to the voltage feedback circuit; and
   a switching control circuit, comprising:
      a pulse width modulated (PWM) signal generator having a feedback/supply input and a switching output signal;
      a first field effect transistor (FET) having a first gate coupled to the switching output signal, a first drain coupled to the primary winding; and
      a second FET having a drain coupled to the DC supply voltage, a source coupled to the feedback/supply input, and a gate coupled to the feedback capacitor, wherein the second FET is adapted to supply current to the PWM signal generator and the feedback capacitor during start up of the switching power supply, and is further adapted to provide substantially near zero current to the PWM signal generator when a feedback voltage on the feedback capacitor reaches a predetermined value.

9. The switching power supply of claim 8, wherein the power supply circuit includes a full wave bridge rectifier and a filter capacitor.

10. The switching power supply of claim 8, wherein the first and second output voltage circuits each include a switching rectifier diode and a filter capacitor.

11. The switching power supply of claim 8, wherein the feedback circuit includes a voltage feedback amplifier and a photo isolator.

12. The switching power supply of claim 8, wherein the switching control circuit further includes a current sense resistor coupled between a first source of the first FET and a ground potential.

13. The switching power supply of claim 12, wherein the PWM signal generator is adapted to detect a current flowing through the current sense resistor.

14. The switching power supply of claim 8, wherein the switching control circuit further includes a compensation capacitor that prevents current overshooting in the first FET.

15. The switching power supply of claim 8, wherein the first FET is a metal oxide semiconductor field effect transistor.

16. The switching power supply of claim 8, wherein the second FET is a junction field effect transistor.

* * * * *